(12) United States Patent
Liu et al.

(10) Patent No.: US 11,272,190 B2
(45) Date of Patent: Mar. 8, 2022

(54) INTEGRATED CIRCUIT AND METHOD OF STORING PROBABILITY TABLES FOR VIDEO DECODING

(71) Applicant: Shanghai Zhaoxin Semiconductor Co., Ltd., Shanghai (CN)

(72) Inventors: Shuoshuo Liu, Shanghai (CN); Wei Wang, Shanghai (CN); Ruiyang Chen, Shanghai (CN)

(73) Assignee: GLENFLY TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/078,379

(22) Filed: Oct. 23, 2020

(65) Prior Publication Data

US 2021/0400282 A1 Dec. 23, 2021

(30) Foreign Application Priority Data

Jun. 18, 2020 (CN) .......................... 202010558002.8

(51) Int. Cl.
*H04N 7/12* (2006.01)
*H04N 19/172* (2014.01)
*H04N 19/423* (2014.01)
*H04N 19/44* (2014.01)
*G06N 7/00* (2006.01)

(52) U.S. Cl.
CPC .......... *H04N 19/172* (2014.11); *G06N 7/005* (2013.01); *H04N 19/423* (2014.11); *H04N 19/44* (2014.11)

(58) Field of Classification Search
CPC .... H04N 19/172; H04N 19/44; H04N 19/423; G06N 7/005
USPC ...................................................... 375/240.25
See application file for complete search history.

(56) References Cited

U.S. PATENT DOCUMENTS

| | | | | |
|---|---|---|---|---|
| 6,594,792 B1* | 7/2003 | Hladik | .............. | H03M 13/2957 714/755 |
| 10,873,766 B2* | 12/2020 | Schierl | .................. | H04N 19/107 |
| 2008/0104488 A1* | 5/2008 | Cheng | .................. | H03M 13/413 714/794 |
| 2014/0086305 A1* | 3/2014 | Esenlik | ................ | H04N 19/597 375/240.02 |
| 2014/0334538 A1* | 11/2014 | Okawa | .................. | H04N 19/119 375/240.03 |
| 2015/0182688 A1* | 7/2015 | Dhami | ................... | A61M 5/142 604/151 |
| 2019/0124364 A1* | 4/2019 | Schierl | ................... | H04N 19/13 |

(Continued)

*Primary Examiner* — Gims S Philippe
(74) *Attorney, Agent, or Firm* — McClure, Qualey & Rodack, LLP

(57) ABSTRACT

An integrated circuit is provided. The integrated circuit includes a first volatile memory, a second volatile memory, and a video decoder. In response to the video decoder starting video decoding on a current frame of a video stream, the video decoder reads an initial probability table for the current frame from a memory unit external to the integrated circuit, and stores the initial probability table in the first volatile memory. When a decoding phase of the current tile is completed, the video decoder complements the probability table corresponding to each row of the second volatile memory according to control flags corresponding to the rows of the first volatile memory and the second volatile memory to obtain a complete probability table, and writes the complete probability table to the memory unit.

12 Claims, 6 Drawing Sheets

(56) References Cited

U.S. PATENT DOCUMENTS

2020/0142642 A1* 5/2020 Billa ..................... G06F 3/0608
2020/0260096 A1* 8/2020 Ikai ...................... H04N 19/176

* cited by examiner

INTEGRATED CIRCUIT AND METHOD OF STORING PROBABILITY TABLES FOR VIDEO DECODING

CROSS REFERENCE TO RELATED APPLICATIONS

This Application claims priority of China Patent Application No. 202010558002.8, filed on Jun. 18, 2020, the entirety of which is incorporated by reference herein.

BACKGROUND OF THE INVENTION

Field of the Invention

The present invention relates in general to video decoding, and, in particular, to an integrated circuit and a method of storing probability tables for video decoding.

Description of the Related Art

In the advanced video coding/decoding (codec) standards (e.g., AV1, HEVC, etc.) that are used nowadays, an image frame can be divided into a plurality of tiles. During the decoding process of all tiles in the same image frame, the same initial probability table is used. However, the probability table will be updated during the decoding process. Accordingly, while decoding an image frame in a video stream, the conventional video decoder has to obtain the initial probability table from an external buffer (e.g., DRAM) before starting the decoding of each tile in the image frame.

If an image frame is divided into a plurality of tiles, when decoding the image frame, the conventional video decoder has to repeatedly read the same probability table from the buffer many times. Because a complete probability table has about 20M bytes of data, a conventional video decoder needs to read 20M bytes of data from an external buffer when decoding each tile of the current image frame. It will use up the data bandwidth between the video decoder and the external buffer, and will seriously slow down the decoding speed of the AV1 video stream by the video decoder.

BRIEF SUMMARY OF THE INVENTION

In an exemplary embodiment, an integrated circuit is provided. The integrated circuit includes: a first volatile memory, a second volatile memory, and a video decoder. The video decoder is configured to perform video decoding on a video stream. In response to the video decoder starting video decoding of a current frame of a video stream, the video decoder reads an initial probability table for a current frame of the video stream from a memory unit that is external to the integrated circuit, and stores the initial probability table in a first volatile memory, wherein the current frame is divided into a plurality of tiles. In response to entering a decoding phase of the current tile, the video decoder initializes a plurality of control flags of a plurality of rows in the first volatile memory and the second volatile memory to 0, and determines whether to read a probability table required by a decoding process from a specific row of the first volatile memory or the second volatile memory according to the control flag corresponding to the specific row of the first volatile memory and the second volatile memory. The video decoder updates the probability table, writes the updated probability table into the specific row of the second volatile memory, and sets the control flag corresponding to the specific row to 1. When a decoding phase of the current tile is completed, the video decoder complements the probability table corresponding to each row of the second volatile memory according to the control flags corresponding to the rows of the first volatile memory and the second volatile memory to obtain a complete probability table, and writes the complete probability table to the memory unit.

In some embodiments, the video stream supports AOMedia Video 1 (AV1) standard.

In some embodiments, during the decoding phase of the current frame, the video decoder uses the same initial probability table to perform decoding on each tile of the current frame.

In some embodiments, during the decoding phase of the current frame, the video decoder determines a value of the control flag corresponding to a specific row where the probability table required for the decoding process of the current tile is located at. When the video decoder determines that the control flag corresponding to the specific row is 0, the video decoder reads the required probability table from the specific row of the first volatile memory. When the video decoder determines that the control flag corresponding to the specific row is 1, the video decoder reads the required probability table from the specific row of the second volatile memory.

In some embodiments, when the decoding phase of the current tile is completed, the video decoder further determines a value of the control flag corresponding to each row of the first volatile memory and the second volatile memory, and copies initial probability table data stored in each row having the control flag of 0 in the first volatile memory to each corresponding row in the second volatile memory to obtain the complete probability table.

In some embodiments, when the video decoder enables a function of referencing a cross-frame probability table, the completed probability table written to the memory unit by the video decoder is used for the decoding process of a subsequent frame next to the current frame.

In another exemplary embodiment, a method of storing probability tables for video decoding for use in an integrated circuit is provided. The integrated circuit includes a first volatile memory and a second volatile memory. The method includes the following steps: in response to starting video decoding of a current frame of a video stream, reading an initial probability table for a current frame of the video stream from a memory unit that is external to the integrated circuit, and storing the initial probability table in a first volatile memory, wherein the current frame is divided into a plurality of tiles; in response to entering a decoding phase of the current tile, initializing a plurality of control flags of a plurality of rows in the first volatile memory and the second volatile memory to 0, and determining whether to read a probability table required by a decoding process from a specific row of the first volatile memory or the second volatile memory according to the control flag corresponding to the specific row of the first volatile memory and the second volatile memory; updating the probability table, writing the updated probability table into the specific row of the second volatile memory, and setting the control flag corresponding to the specific row to 1; and when a decoding phase of the current tile is completed, complementing the probability table corresponding to each row of the second volatile memory according to the control flags corresponding to the rows of the first volatile memory and the second volatile memory to obtain a complete probability table, and writing the complete probability table to the memory unit.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

It must be understood that the words "including", "including" and other words used in this specification are used to indicate the existence of specific technical features, values, method steps, operations, elements and/or components, but not It is not excluded that more technical features, values, method steps, job processing, elements, components, or any combination of the above can be added.

Figure 1:
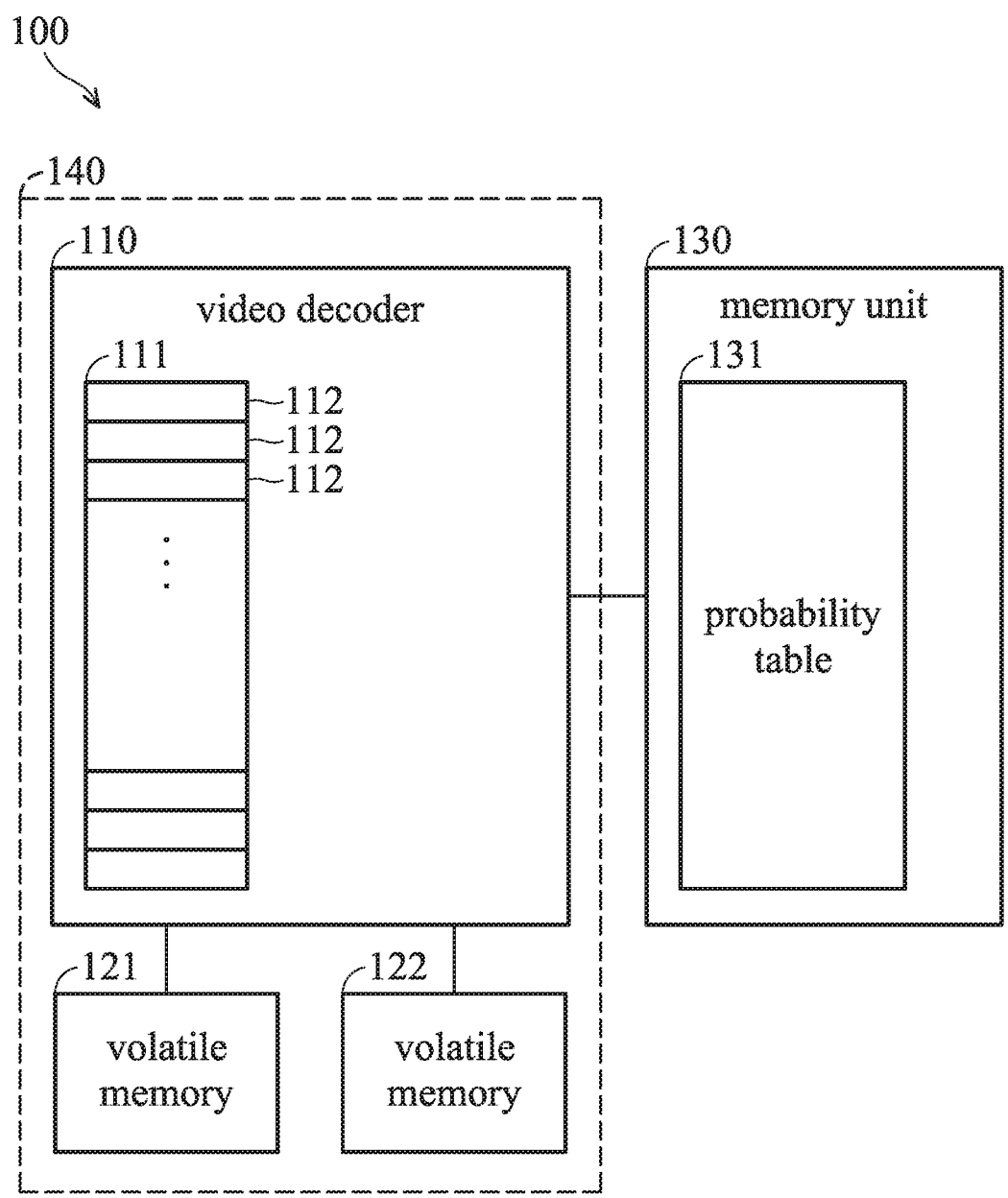
FIG. 1 is a diagram of a video-decoding apparatus in accordance with an embodiment of the invention.

FIG. 1 is a diagram of a video-decoding apparatus in accordance with an embodiment of the invention.

As depicted in FIG. 1, the video-decoding apparatus includes a video decoder 110, volatile memories 121 and 122, and a memory unit 130. The video decoder 110 is configured to decode a video stream to obtain a plurality of image frames. In some embodiments, the video decoder 110 may support video codec standards such as the AOMedia Video 1 (AV1) or High Efficiency Video Coding (HEVC), but the invention is not limited thereto. In an embodiment, the video decoder may be implemented by a hardware circuit such as an application-specific integrated circuit (ASIC), a field-programmable gate array (FPGA), or other logic circuit having the same function, but the invention is not limited thereto. In another embodiment, the video decoder 110 may be implemented by a central processing unit (CPU) or a digital signal processor (DSP) that perform a corresponding program code.

The volatile memories 121 and 122 may be static random access memories (SRAMs) that are configured to temporarily store the probability tables required in the video-decoding process performed by the video decoder 110. In some embodiments, the volatile memory 122 can be regarded as a static read-only memory (SROM). In some embodiments, the video decoder 110 and the volatile memories 121 and 122 can be integrated into an integrated circuit 140.

In addition, the video decoder 110 may include a register file 111 that include a plurality of registers 112. Each register 112 is configured to store a control flag of a corresponding row in the volatile memories 121 and 122. While performing the decoding process of each tile, the video decoder 110 may determine whether to read the required probability table from the volatile memory 121 or the volatile memory 121 according to each control flag. In some embodiments, the register file 111 can be disposed outside the video decoder 110.

The memory unit 130, for example, may be a dynamic random access memory (DRAM), that is configured store all probability tables and updated probability tables (i.e., collectively regarded as probability table 131) during the video-decoding process.

Figure 2:
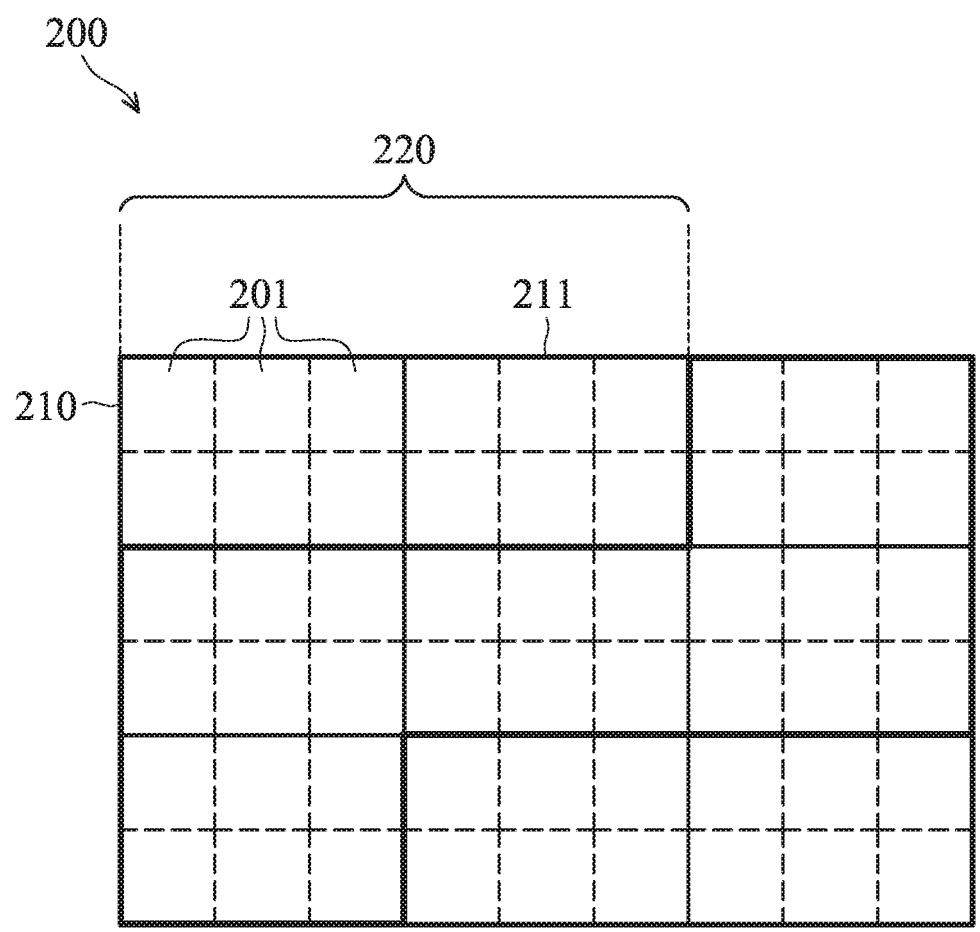
FIG. 2 is a diagram of an image frame and its divisions in accordance with an embodiment of the invention.

FIG. 2 is a diagram of an image frame and its divisions in accordance with an embodiment of the invention.

As depicted in FIG. 2, the image frame 200 may be divided into a plurality of superblocks 201 or coding tree units (CTUs), wherein size of each superblock may be 128×128 or 64×64 pixels. In addition, multiple superblocks may form a tile. For example, each of tiles 210 and 211 includes 6 superblocks. Multiple tiles may form a tile group. For example, tiles 210 and 211 forms the tile group 220.

In the AV1 standard, an image frame is divided into 128 tiles at most, and the video decoder needs to frequently use the probability table in the decoding process of the AV1 video stream. In the embodiment, size of each complete probability table is about 20M bytes. If the volatile memory 121 or 122 is used to store a probability table, the volatile memory 121 and 122 can be implemented by an SRAM having 640 rows, where each row has 256 bits.

In addition, during the decoding process of the AV1 standard, it is allowed to use the updated probability table of the previously decoded frame. That is, the video decoder 110 may store updated probability tables of one or more designated decoded tiles in the current frame into the memory unit 130 for the decoding process of the subsequent frame.

FIGS. 3A-3E are diagrams of the register file and volatile memories in accordance with an embodiment of the invention.

In an embodiment, before each time the video decoder 110 starts to decode the current frame, the video decoder 110 may read the complete initial probability table required by the decoding process of the current frame from the memory unit 130, and store the initial probability table in the volatile memory 122. During the decoding process of the current frame, the volatile memory 122 is in a read-only status, that is, the initial probability table stored in the volatile memory 122 can only be read but cannot be written. In addition, in the decoding process of the current frame, the volatile memory 121 is used to store the updated probability table of the tiles in the current frame, and the video decoder 110 may read the probability table in the volatile memory 121, or write the probability table data into the volatile memory 121. For convenience of description, in the embodiment, each of the volatile memories 121 and 122 includes 640 rows, where N=0 to 639 denotes row 0 to row 639.

Figure 3A:
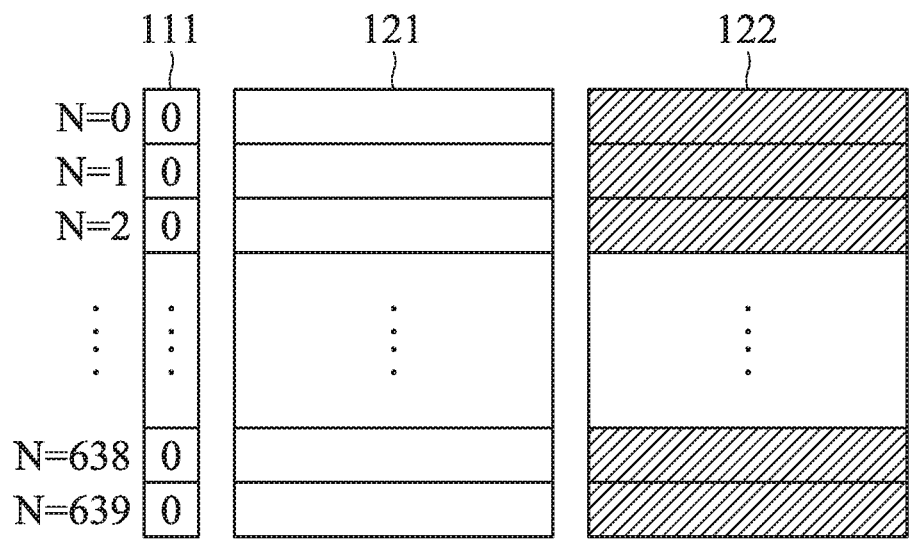
FIGS. 3A-3E are diagrams of the register file and volatile memories in accordance with an embodiment of the invention.

Afterwards, the video decoder 110 may perform decoding on each tile of the current frame with a predetermined order. For example, when the video decoder 110 starts to decode the current tile of the current frame, the video decoder 110 may initialize values stored in all registers 112 of the register file 111 to 0 (i.e., resetting the register file 111), as shown in FIG. 3A.

During the decoding process of the current tile, the video decoder 110 may determine whether to read the probability table required in the decoding process from the volatile memory 121 or the volatile memory 122 according to a control flag corresponding to a specific row. For example, if the video decoder 110 determines that the required probability table is located in a specific row (e.g., N=2 or the second row) and the control flag of the specific row is 0, the video decoder 110 may read the required probability table from the volatile memory 122. Compared with the completed initial probability table, the read probability table can be regarded as a partial probability table.

Figure 3B:
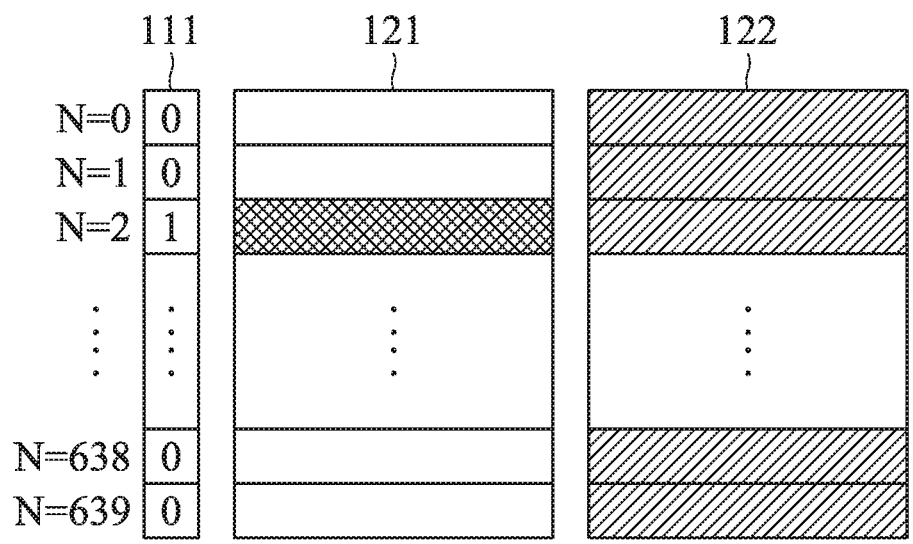

Because the video decoder 110 will update the content of the probability table of the current tile in real time during the decoding process of the current tile, the video decoder 110 will read the required probability table from the volatile memory 122, write the updated probability table into the specific row of the volatile memory 121, and set the control flag corresponding to the specific row to 1, as shown in FIG. 3B.

Figure 3C:
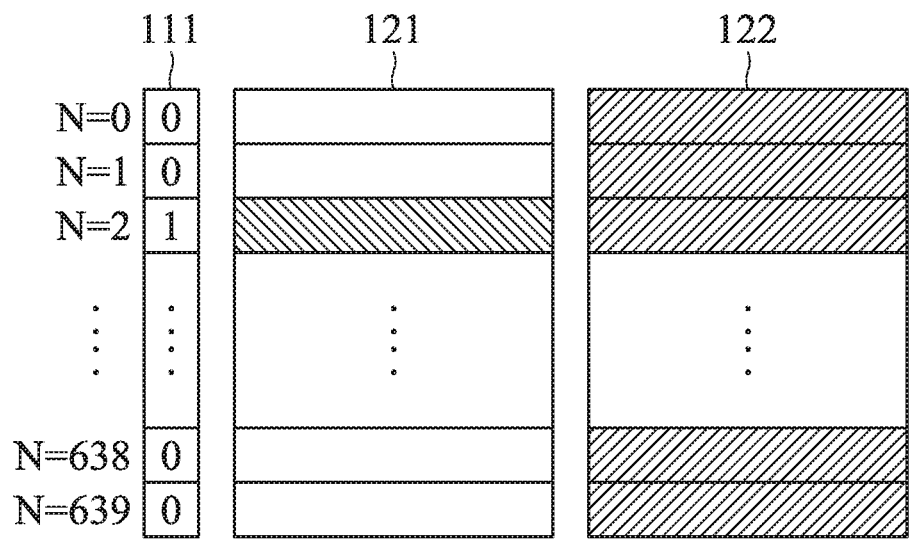

It should be noted that, meanwhile, the specific row of the volatile memory 121 has stored the updated probability table, and the video decoder may still use the updated probability table in the specific row again during the decoding process of the current tile. Since the control flag of the specific row has been set to 1, in this situation, when the video decoder 110 wants to use the probability table in the specific row, the video decoder 110 may determine that the control flag corresponding to the specific row is 1. Thus, the video decoder 110 will read the updated probability table from the specific row of the volatile memory 121. Similarly, the video decoder 110 will keep updating the content of the probability table of the current tile in real time during the decoding process of the current tile, the video decoder 110 will read the probability table stored in the specific row of the volatile memory 122 and update the probability table again. Then, the video decoder 110 will write the updated probability table into the specific row of the volatile memory 121, and keep the control flag corresponding to the specific row at 1 (i.e., set to 1 again), as shown in FIG. 3C.

In some embodiments, the video decoder 110 may enable the function of referencing a cross-frame probability table. That is, the video decoder 110 allows the decoding process of the current frame (e.g., t=N) to reference the updated probability table of the previously decoded frame (e.g., t=N−1). In the situation of the function of referencing the cross-frame probability table being enabled, when the video decoder 110 has completed decoding of the current tile of the current frame, the video decoder 110 may complement (i.e., fill empty content) each row of the probability table stored in the volatile memory 121 according to the value of the control flag in each register 112 of the register file 111, thereby obtaining a complete updated probability table (abbreviated as the complete probability table), and writing the complete updated probability table into the memory unit 130 for the decoding process of the subsequent frame.

Figure 3D:
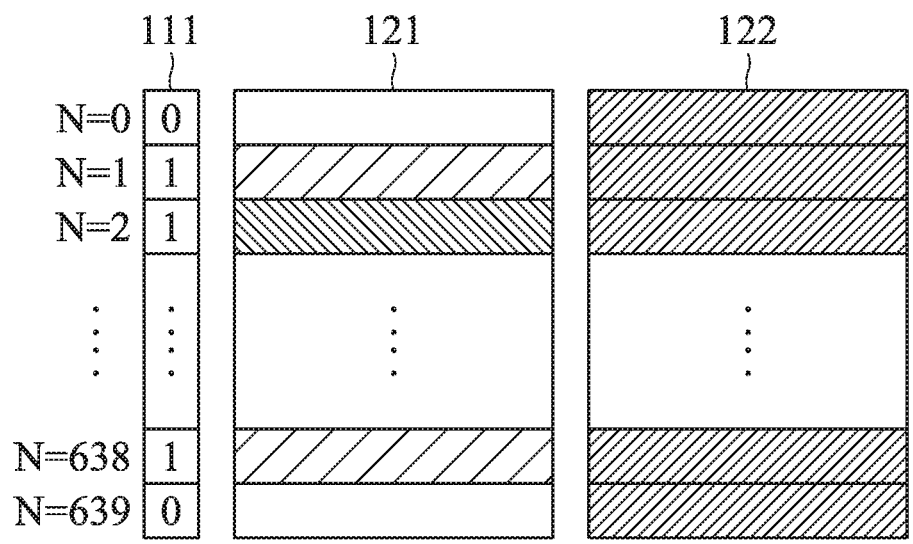
Figure 3E:
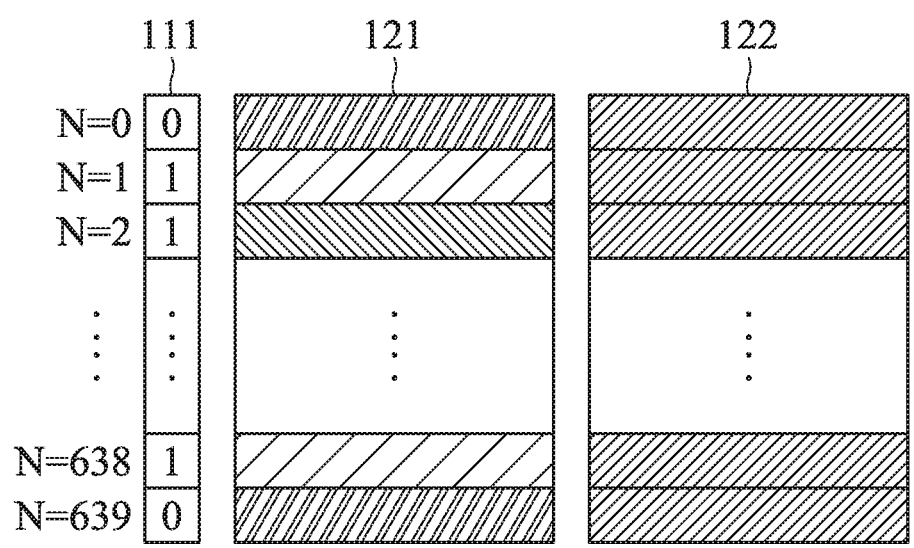

For example, as shown in FIG. 3D, when the video decoder 110 has completed decoding of a specific tile of the current frame, the control flags corresponding to rows 1, 2, and 638 are set to 1, and the control flags of other rows are kept at 0. Accordingly, the video decoder 110 may write rows 0, 3 to 637, and 639 of the initial probability table stored in the volatile memory 122 into rows 0, 3 to 637, and 639 of the volatile memory 121, thereby obtaining the complete updated probability table, as shown in FIG. 3E. The video decoder 110 may write the complete updated probability table in the volatile memory 121 into the memory unit 130 for the decoding process of the subsequent frame (e.g., t=N+1) after the current frame (e.g., t=N).

In the embodiment, each access (including reading and writing) of the volatile memories 121 and 122 by the video decoder is performed in rows. If the probability table used by each decoding operation is located in the same row of the volatile memory 121 or 122, the video decoder 110 may read the same row from the volatile memory 121 or 122 to perform the decoding operation. In the entropy decoding of the AV1 standard, the probability table used by each syntax may include 16 entries at most, and size of each entry is 2 bytes. That is, the decoding operation of a syntax performed by the video decoding 110 uses at most one row of data in the volatile memory 121 or 122. If the number of entries used by a certain syntax is small, multiple probability tables corresponding to multiple syntaxes can be arranged in the same row of the volatile memory 121 or 122.

In addition, when the video decoder 110 starts the decoding process of each frame in the video stream, the data read from the memory unit 130 to the volatile memory 122 is a complete probability table, which includes the probability tables of all syntaxes used by the entropy decoding of the AV1 standard. However, not all data in the complete probability table is used by the decoding process of each tile of the current frame. In most cases, a portion of data of the complete probability table stored in the volatile memory 122 is used. In addition, the control flags can be used to control the data-copying operations from the volatile memory 122 to the volatile memory 121 (i.e., complement probability data in each row of the volatile memory 122), thereby reducing unnecessary data transmission between the volatile memories 121 and 122 and increasing the decoding speed of the video decoder 110.

Figure 4:
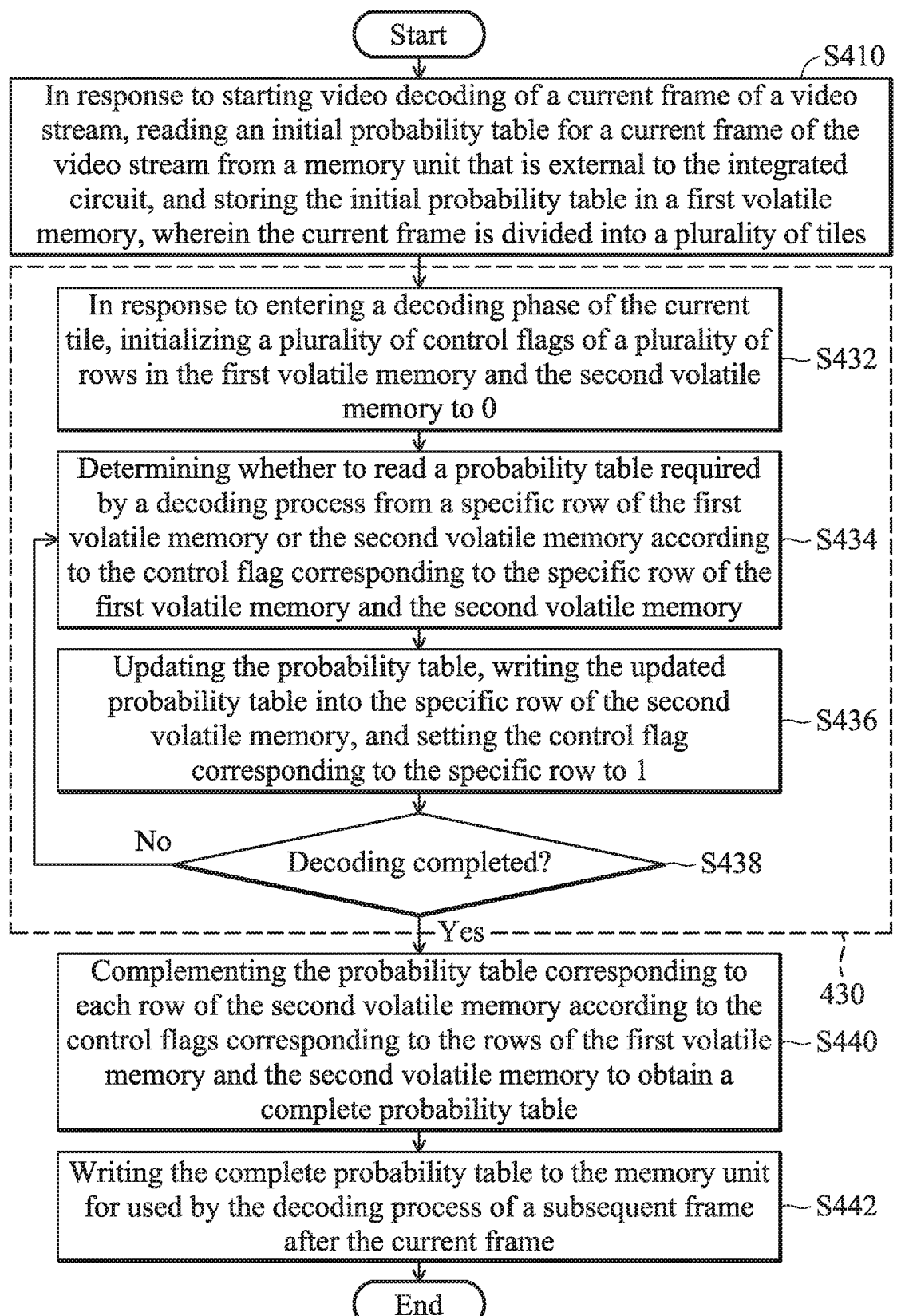
FIG. 4 is a flow chart of a method of storing probability tables for video decoding in accordance with an embodiment of the invention.

FIG. 4 is a flow chart of a method of storing probability tables for video decoding in accordance with an embodiment of the invention.

Referring to FIG. 1 and FIG. 4, in step S410, in response to starting video decoding of a current frame of a video stream, an initial probability table for the current frame is read from the memory unit 130 that is external to the integrated circuit 140, and the initial probability table is stored in a first volatile memory (e.g., volatile memory 122), wherein the current frame is divided into a plurality of tiles. In addition, the video decoder 110 may perform decoding on each tile of the current frame in a predetermined order.

Block 430 refers to the decoding phase of the current tile. The decoding phase of the current tile includes steps S432 to S438.

In step S432, in response to entering the decoding phase of the current tile, a plurality of control flags of a plurality of rows in the first volatile memory and the second volatile memory are initialized to 0.

In step S434, it is determined whether to read the probability table required by the decoding process from a specific row of the first volatile memory or the second volatile memory according to the control flag corresponding to the specific row of the first volatile memory and the second volatile memory. For example, if the video decoder 110 determines that the required probability table is located in a specific row (e.g., N=2 or the second row) and the control flag of the specific row is 0, the video decoder 110 may read the required probability table from the first volatile memory (e.g., volatile memory 122). If the control flag corresponding to the specific row is 1, the video decoder 110 will read the required probability table from the specific row of the first volatile memory (e.g., volatile memory 121).

In step S436, the probability table is updated, and the updated probability table is written into the specific row of the second volatile memory, and the control flag corresponding to the specific row is set to 1. For example, because the video decoder 110 will update the content of the probability table of the current tile in real time during the decoding process of the current tile, the video decoder 110 will read the required probability table from the volatile memory 122, write the updated probability table into the specific row of the volatile memory 121, and set the control flag corresponding to the specific row to 1. When the video decoder 110 wants to use the probability table in the specific row, the video decoder 110 may determine that the control flag corresponding to the specific row is 1. Thus, the video decoder 110 will read the updated probability table from the specific row of the volatile memory 121. Similarly, the video decoder 110 will keep updating the content of the probability table of the current tile in real time during the decoding process of the current tile, the video decoder 110 will read the probability table stored in the specific row of the volatile memory 122 and update the probability table again. Then, the video decoder 110 will write the updated probability table into the specific row of the volatile memory 121, and keep the control flag corresponding to the specific row at 1 (i.e., set to 1 again).

In step S438, it is determined whether the decoding process of the current tile is completed. If it is determined that the decoding process of the current tile is completed, step S440 is performed. If it is determined that the decoding process of the current tile is not complete yet, step S434 is performed to determine whether to read the probability table required in the decoding process of the next specific row of the first volatile memory or the second volatile memory according to the control flag of the next specific row.

In step S440, the probability table corresponding to each row of the second volatile memory is complemented according to the control flags corresponding to the rows of the first volatile memory and the second volatile memory to obtain a complete probability table.

In step S442, the complete probability table is written into a memory unit for used by the decoding process of a subsequent frame after the current frame. For example, as shown in FIG. 3D, when the video decoder 110 has completed decoding of a specific tile of the current frame, the control flags corresponding to rows 1, 2, and 638 are set to 1, and the control flags of other rows are kept at 0. Accordingly, the video decoder 110 may write rows 0, 3 to 637, and 639 of the initial probability table stored in the volatile memory 122 into rows 0, 3 to 637, and 639 of the volatile memory 121, thereby obtaining the complete updated probability table, as shown in FIG. 3E. The video decoder 110 may write the complete updated probability table in the volatile memory 121 into the memory unit 130 for the decoding process of the subsequent frame (e.g., t=N+1) after the current frame (e.g., t=N). In the situation of the function of referencing the cross-frame probability table being enabled, when the video decoder 110 has completed decoding of the current tile of the current frame, the video decoder 110 may complement (i.e., fill empty content) each row of the probability table stored in the volatile memory 121 according to the value of the control flag in each register 112 of the register file 111, thereby obtaining a complete updated probability table (abbreviated as the complete probability table), and writing the complete updated probability table into the memory unit 130 for the decoding process of the subsequent frame.

In view of the above, an integrated circuit and a method of storing probability tables for video decoding are provided, which can be configured with a static read-only memory (e.g., volatile memory 122) and a static random access memory (e.g., volatile memory 121) to separately store the initial probability table and the update probability table, so that the video decoder can perform decoding on each tile of the current frame without repeatedly reading the initial probability table from the external memory unit, thereby reducing the required read bandwidth between the external memory unit and the video decoder, and increasing the speed of video decoding. In addition, the control flags can be used to control the data-copying operations from the volatile memory 122 to the volatile memory 121 (i.e., complement probability data in each row of the volatile memory 122), thereby reducing unnecessary data transmission between the volatile memories 121 and 122 and increasing the decoding speed of the video decoder 110.

Words such as "first", "second", and "third" used in the claims are used to modify the elements in the claims, and are not used to indicate that there is an order of priority, antecedent relationship, or It is an element that precedes another element, or the chronological order of execution of method steps, which is only used to distinguish elements with the same name.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated circuit, receiving a video stream, the integrated circuit comprising:
    a first volatile memory;
    a second volatile memory; and
    a video decoder, configured to perform video decoding on the video stream;
    wherein in response to the video decoder starting video decoding of a current frame of a video stream, the video decoder reads an initial probability table for a current frame of the video stream from a memory unit that is external to the integrated circuit, and stores the initial probability table in a first volatile memory, wherein the current frame is divided into a plurality of tiles,
    wherein in response to entering a decoding phase of a current tile of the current frame, the video decoder initializes a plurality of control flags of a plurality of rows in the first volatile memory and the second volatile memory to 0, and determines whether to read a probability table required by a decoding process from a specific row of the first volatile memory or the second volatile memory according to the control flag corresponding to the specific row of the first volatile memory and the second volatile memory,
    wherein the video decoder updates the probability table, writes the updated probability table into the specific row of the second volatile memory, and sets the control flag corresponding to the specific row to 1,
    wherein when a decoding phase of the current tile is completed, the video decoder complements the probability table corresponding to each row of the second volatile memory according to the control flags corresponding to the rows of the first volatile memory and the second volatile memory to obtain a complete probability table, and writes the complete probability table to the memory unit.

2. The integrated circuit as claimed in claim 1, wherein the video stream supports AOMedia Video 1 (AV1) standard.

3. The integrated circuit as claimed in claim 1, wherein during the decoding phase of the current frame, the video decoder uses the same initial probability table to perform decoding on each tile of the current frame.

4. The integrated circuit as claimed in claim 1, wherein during the decoding phase of the current frame, the video decoder determines a value of the control flag corresponding to a specific row where the probability table required for the decoding process of the current tile is located,
- wherein when the video decoder determines that the control flag corresponding to the specific row is 0, the video decoder reads the required probability table from the specific row of the first volatile memory,
- wherein when the video decoder determines that the control flag corresponding to the specific row is 1, the video decoder reads the required probability table from the specific row of the second volatile memory.

5. The integrated circuit as claimed in claim 1, wherein when the decoding phase of the current tile is completed, the video decoder further determines a value of the control flag corresponding to each row of the first volatile memory and the second volatile memory, and copies initial probability table data stored in each row having a control flag of 0 in the first volatile memory to each corresponding row in the second volatile memory to obtain the complete probability table.

6. The integrated circuit as claimed in claim 1, wherein when the video decoder enables a function of referencing a cross-frame probability table, the completed probability table written to the memory unit by the video decoder is used for the decoding process of a subsequent frame next to the current frame.

7. A method of storing probability tables for video decoding for use in an integrated circuit, wherein the integrated circuit comprises a first volatile memory and a second volatile memory, the method comprising:
- in response to starting video decoding of a current frame of a video stream, reading an initial probability table for a current frame of the video stream from a memory unit that is external to the integrated circuit, and storing the initial probability table in a first volatile memory, wherein the current frame is divided into a plurality of tiles;
- in response to entering a decoding phase of a current tile of the current frame, initializing a plurality of control flags of a plurality of rows in the first volatile memory and the second volatile memory to 0, and determining whether to read a probability table required by a decoding process from a specific row of the first volatile memory or the second volatile memory according to the control flag corresponding to the specific row of the first volatile memory and the second volatile memory;
- updating the probability table, writing the updated probability table into the specific row of the second volatile memory, and setting the control flag corresponding to the specific row to 1; and
- when a decoding phase of the current tile is completed, complementing the probability table corresponding to each row of the second volatile memory according to the control flags corresponding to the rows of the first volatile memory and the second volatile memory to obtain a complete probability table, and writing the complete probability table to the memory unit.

8. The method as claimed in claim 7, wherein the video stream supports AOMedia Video 1 (AV1) standard.

9. The method as claimed in claim 7, further comprising:
- during the decoding phase of the current frame, using the same initial probability table to perform decoding on each tile of the current frame.

10. The method as claimed in claim 7, further comprising:
- during the decoding phase of the current frame, determining a value of the control flag corresponding to a specific row where the probability table required for the decoding process of the current tile is located;
- when it is determined that the control flag corresponding to the specific row is 0, reading the required probability table from the specific row of the first volatile memory; and
- when it is determined that the control flag corresponding to the specific row is 1, reading the required probability table from the specific row of the second volatile memory.

11. The method as claimed in claim 7, further comprising:
- when the decoding phase of the current tile is completed, determining a value of the control flag corresponding to each row of the first volatile memory and the second volatile memory, and copying initial probability table data stored in each row having the control flag of 0 in the first volatile memory to each corresponding row in the second volatile memory to obtain the complete probability table.

12. The method as claimed in claim 7, when a function of referencing a cross-frame probability table is enabled, the completed probability table written to the memory unit is used for the decoding process of a subsequent frame next to the current frame.

* * * * *